United States Patent [19]
Shinada et al.

[11] Patent Number: 5,198,741
[45] Date of Patent: Mar. 30, 1993

[54] DRIVE CONTROL SYSTEM OF STEPPING MOTOR

[75] Inventors: Yasuyuki Shinada, Yokohama; Masahiro Sakamoto; Junnosuke Kataoka, both of Tokyo, all of Japan

[73] Assignee: Canon Kabushiki Kaisha, Tokyo, Japan

[21] Appl. No.: 560,763

[22] Filed: Jul. 31, 1990

[30] Foreign Application Priority Data

| Jul. 31, 1989 | [JP] | Japan | 1-196781 |
| Mar. 16, 1990 | [JP] | Japan | 2-66101 |
| Mar. 16, 1990 | [JP] | Japan | 2-66102 |
| Mar. 16, 1990 | [JP] | Japan | 2-66103 |
| Mar. 16, 1990 | [JP] | Japan | 2-66104 |

[51] Int. Cl.$^5$ .............................................. H02P 8/00
[52] U.S. Cl. ..................................... 318/696; 318/685
[58] Field of Search ............... 318/696, 685; 358/421, 358/498, 296

[56] References Cited

U.S. PATENT DOCUMENTS

| 4,140,956 | 2/1979 | Pritchard | 318/696 |
| 4,443,746 | 4/1984 | Araki | 318/696 |
| 4,638,372 | 1/1987 | Leng et al. | 358/296 |
| 4,710,691 | 12/1987 | Bergstrom et al. | 318/696 |
| 4,926,270 | 5/1990 | Sakamoto | 358/498 |
| 5,008,607 | 4/1991 | Ono et al. | 318/696 |
| 5,062,006 | 10/1991 | Miura | 358/421 |

Primary Examiner—William M. Shoop, Jr.
Assistant Examiner—Karen Masih

[57] ABSTRACT

A drive control system for a stepping motor which stores values for the current driving each phase of the motor in data tables. A central processing unit drives the motor in accordance with the current values stored in the data tables. The current values are stored in the data table with corresponding addresses. The current values are read out sequentially from the addresses in the data tables. Each time the address is incremented by 1, the magnitude of the angle of rotation of the motor is set so that it is always the same.

8 Claims, 15 Drawing Sheets

FIG. 3

| ADDRESS | (%) PHASE A | (%) PHASE B | ADDRESS | (%) PHASE A | (%) PHASE B |
|---|---|---|---|---|---|
| 0 | 0 | -100 | 32 | - 0 | 100 |
|  | 3.5 | - 98 |  | - 3.5 | 98 |
|  | 8 | - 97 |  | - 8 | 97 |
|  | 12 | - 95 |  | - 12 | 95 |
|  | 17 | - 92 |  | - 17 | 92 |
|  | 22 | - 89 |  | - 22 | 89 |
|  | 26 | - 86 |  | - 26 | 86 |
|  | 30 | - 82 |  | - 30 | 82 |
| 8 | 34 | - 78 | 40 | - 34 | 78 |
|  | 45 | - 72 |  | - 45 | 72 |
|  | 60 | - 60 |  | - 60 | 60 |
|  | 80 | - 38 |  | - 80 | 38 |
|  | 87 | - 24 |  | - 87 | 24 |
|  | 93 | - 15 |  | - 93 | 15 |
|  | 97 | - 7.5 |  | - 97 | 7.5 |
|  | 99 | - 2.5 |  | - 99 | 2.5 |
| 16 | 100 | 0 | 48 | -100 | 0 |
|  | 98 | 3.5 |  | - 98 | - 3.5 |
|  | 97 | 8 |  | - 97 | - 8 |
|  | 95 | 12 |  | - 95 | - 12 |
|  | 92 | 17 |  | - 92 | - 17 |
|  | 89 | 22 |  | - 89 | - 22 |
|  | 86 | 26 |  | - 86 | - 26 |
|  | 82 | 30 |  | - 82 | - 30 |
| 24 | 78 | 34 | 56 | - 78 | - 34 |
|  | 72 | 45 |  | - 72 | - 45 |
|  | 60 | 60 |  | - 60 | - 60 |
|  | 38 | 80 |  | - 38 | - 80 |
|  | 24 | 87 |  | - 24 | - 87 |
|  | 15 | 93 |  | - 15 | - 93 |
|  | 7.5 | 97 |  | - 7.5 | - 97 |
|  | 2.5 | 99 |  | - 2.5 | - 99 |

FIG. 7

| ADDRESS | (%) PHASE A | (%) PHASE B | ADDRESS | (%) PHASE A | (%) PHASE B |
|---|---|---|---|---|---|
| 0 | 0 | −100 | 32 | − 0 | 100 |
|   | 3.5 | − 98 |   | − 3.5 | 98 |
|   | 8 | − 97 |   | − 8 | 97 |
|   | 12 | − 95 |   | − 12 | 95 |
|   | 17 | − 92 |   | − 17 | 92 |
|   | 22 | − 89 |   | − 22 | 89 |
|   | 28 | − 84 |   | − 28 | 84 |
|   | 34 | − 78 |   | − 34 | 78 |
| 8 | 42 | − 73 | 40 | − 42 | 73 |
|   | 60 | − 60 |   | − 60 | 60 |
|   | 71 | − 46 |   | − 71 | 46 |
|   | 80 | − 34 |   | − 80 | 34 |
|   | 87 | − 24 |   | − 87 | 24 |
|   | 93 | − 15 |   | − 93 | 15 |
|   | 97 | − 7.5 |   | − 97 | 7.5 |
|   | 99 | − 2.5 |   | − 99 | 2.5 |
| 16 | 100 | 0 |   |   |   |
|   | 98 | 3.5 | 48 | −100 | 0 |
|   | 97 | 8 |   | − 98 | − 3.5 |
|   | 95 | 12 |   | − 97 | − 8 |
|   | 92 | 17 |   | − 95 | − 12 |
|   | 89 | 22 |   | − 92 | − 17 |
|   | 84 | 28 |   | − 89 | − 22 |
|   | 78 | 34 |   | − 84 | − 28 |
| 24 | 73 | 42 |   | − 78 | − 34 |
|   | 60 | 60 | 56 | − 73 | − 42 |
|   | 46 | 71 |   | − 60 | − 60 |
|   | 34 | 80 |   | − 46 | − 71 |
|   | 24 | 87 |   | − 34 | − 80 |
|   | 15 | 93 |   | − 24 | − 87 |
|   | 7.5 | 97 |   | − 15 | − 93 |
|   | 2.5 | 99 |   | − 7.5 | − 97 |
|   |   |   |   | − 2.5 | − 99 |

FIG. 11

| ADDRESS | (%) PHASE A | (%) PHASE B | ADDRESS | (%) PHASE A | (%) PHASE B |
|---|---|---|---|---|---|
| 0 | 0 | -100 | 32 | - 0 | 100 |
|   | 3.5 | - 98 |   | - 3.5 | 98 |
|   | 8 | - 97 |   | - 8 | 97 |
|   | 12 | - 95 |   | - 12 | 95 |
|   | 17 | - 92 |   | - 17 | 92 |
|   | 22 | - 89 |   | - 22 | 89 |
|   | 26 | - 86 |   | - 26 | 86 |
|   | 29 | - 85 |   | - 29 | 85 |
| 8 | 32 | - 83 | 40 | - 32 | 83 |
|   | 45 | - 72 |   | - 45 | 72 |
|   | 60 | - 60 |   | - 60 | 60 |
|   | 80 | - 38 |   | - 80 | 38 |
|   | 87 | - 24 |   | - 87 | 24 |
|   | 93 | - 15 |   | - 93 | 15 |
|   | 97 | - 7.5 |   | - 97 | 7.5 |
|   | 99 | - 2.5 |   | - 99 | 2.5 |
| 16 | 100 | 0 | 48 | -100 | 0 |
|   | 98 | 3.5 |   | - 98 | - 3.5 |
|   | 97 | 8 |   | - 97 | - 8 |
|   | 95 | 12 |   | - 95 | - 12 |
|   | 92 | 17 |   | - 92 | - 17 |
|   | 89 | 22 |   | - 89 | - 22 |
|   | 86 | 26 |   | - 86 | - 26 |
|   | 85 | 29 |   | - 85 | - 29 |
| 24 | 83 | 32 | 56 | - 83 | - 32 |
|   | 72 | 45 |   | - 72 | - 45 |
|   | 60 | 60 |   | - 60 | - 60 |
|   | 38 | 80 |   | - 38 | - 80 |
|   | 24 | 87 |   | - 24 | - 87 |
|   | 15 | 93 |   | - 15 | - 93 |
|   | 7.5 | 97 |   | - 7.5 | - 97 |
|   | 2.5 | 99 |   | - 2.5 | - 99 |

FIG. 13

| ADDRESS | PHASE A | PHASE B |
|---------|---------|---------|
| 0 | + 0 | -56 |
| 1 | + 8 | -60 |
| 2 | +16 | -63 |
| 3 | +24 | -60 |
| 4 | +32 | -56 |
| 5 | +38 | -50 |
| 6 | +44 | -40 |
| 7 | +50 | -20 |
| 8 | +56 | 0 |
| 9 | +60 | + 8 |
| 10 | +63 | +16 |
| 11 | +60 | +24 |
| 12 | +56 | +32 |
| 13 | +50 | +38 |
| 14 | +40 | +44 |
| 15 | +20 | +50 |
| 16 | 0 | +56 |
| 17 | - 8 | +60 |
| 18 | -16 | +63 |
| 19 | -24 | +60 |
| 20 | -32 | +56 |
| 21 | -38 | +50 |
| 22 | -44 | +40 |
| 23 | -50 | +20 |
| 24 | -56 | 0 |
| 25 | -60 | - 8 |
| 26 | -63 | -16 |
| 27 | -60 | -24 |
| 28 | -56 | -32 |
| 29 | -50 | -38 |
| 30 | -40 | -44 |
| 31 | -20 | -50 |

FIG. 14

| ADDRESS | PHASE A | PHASE B |
|---------|---------|---------|
| 0 | + 0 | -56 |
| 1 | +20 | -50 |
| 2 | +40 | -44 |
| 3 | +50 | -38 |
| 4 | +56 | -32 |
| 5 | +60 | -24 |
| 6 | +63 | -16 |
| 7 | +60 | - 8 |
| 8 | +56 | 0 |
| 9 | +50 | +20 |
| 10 | +44 | +40 |
| 11 | +38 | +50 |
| 12 | +32 | +56 |
| 13 | +24 | +60 |
| 14 | +16 | +63 |
| 15 | + 8 | +60 |
| 16 | 0 | +56 |
| 17 | -20 | +50 |
| 18 | -40 | +44 |
| 19 | -50 | +38 |
| 20 | -56 | +32 |
| 21 | -60 | +24 |
| 22 | -63 | +16 |
| 23 | -60 | + 8 |
| 24 | -56 | 0 |
| 25 | -50 | -20 |
| 26 | -44 | -40 |
| 27 | -38 | -50 |
| 28 | -32 | -56 |
| 29 | -24 | -60 |
| 30 | -16 | -63 |
| 31 | - 8 | -60 |

DRIVE CONTROL SYSTEM OF STEPPING MOTOR

BACKGROUND OF THE INVENTION

1. Field of the Invention

The present invention generally relates to a drive control system of stepping motors used for feeding paper in facsimile devices, and more particularly is directed to a drive control system of stepping motors employed for performing micro-step driving.

2. Description of the Prior Art

Known stepping motor storing data tables store current values of current flowing in each phase of the motor. The data tables also store addresses for each current value. To read out a particular current value, the address corresponding to the particular current value is accessed. In recent years, for a more accurate driving of a stepping motor, a microstep driving system has been adopted in which the motor can be driven according to addresses for intervals between the phases of the motor.

FIG. 20 shows the data characteristics of the above-mentioned data tables when driving a 2-phase stepping motor. During the driving thereof, the current values of current flowing through the phases A and B of the motor are obtained from the sinusoidal waves of phases A and B shown in FIG. 20, which are 90 degrees out of phase with each other. Therefore, for the current value associated with each address in the table, a numerical value close to those indicated by these curve lines is selected to prepare the data table. The data table provides current values for a 1-cycle portion of the operation of the motor. The table is constructed such that the number of addresses from the address where the phase A current value is at its peak and the phase B current value is zero, to the address at which the current values of phase A and phase B become equal, is the same as the number of addresses from the address where current values of phases A and B become equal, to the address at which the phase A current value is zero and the B phase current value is at its peak. When driving the motor, table addresses are sequentially accessed and driving is achieved according to the read-out current values corresponding to the accessed addresses.

The drive response characteristics of such stepping motors, however, cause the rotation angles to not be uniform, when the addresses are sequentially accessed one by one, as shown in FIG. 20. Thus, there are rotation irregularities. In other words, at an address, C, intermediate between the address where the phase A current value becomes a peak and the address where the phase B current value becomes a peak, each motor displacement $\alpha'$, is not equal to another motor displacement $\beta'$. In this instance, $\alpha'$ represents the displacement to C from the address where the phase A current value becomes a peak, while $\beta'$, denotes the displacement from C to the address where the phase B current value becomes a peak. Thus, rotation irregularities occur in motors rotated under such drive response characteristics, resulting in the generating of noise or vibration. Therefore, precision printing is not possible due to unequal rotation angles which occur during one-by-one sequential accessing of addresses, in spite of the fact that high-accuracy paper feeding is achieved by such microstep driving.

Further, the drive response characteristics of the motor which cause motor rotation irregularities vary, depending on the type of motor and the motor drive conditions, and can accompany different drive pulse rates, different load intensities, and other factors.

Switching between forward rotation and reverse rotation of motors is conventionally achieved by reversing the direction in which addresses are sequentially accessed in a table in which current values are set based on the sinusoidal wave ratios as shown in FIG. 20. Such a switching method was adopted because the drive response characteristics of the motor are symmetrical with respect to the forward and reverse rotational directions of the motor. When an excitation current having such characteristics is applied to each phase, the motor should demonstrate ideal forward and reverse directional rotation.

With actual drive systems, however, because of the effects of loads on motors, it is not possible to attain stable motor driving even when normal/reverse motor rotation is performed by using the identical tables.

SUMMARY OF THE INVENTION

An object of the present invention is to overcome the above-mentioned disadvantages and to provide a drive control system of a stepping motor to ensure a highly accurate drive thereof without uneven rotation thereof.

Another object of the present invention is to achieve a highly accurate paper feeding by making the stepping motor rotate through equal angles each time the addresses are sequentially accessed.

A further object of the present invention is to provide a plurality of data tables of current values of current flowing in each phase of a motor so as to be capable of selecting the current values in conformity with various conditions.

A still further object of the present invention will be clarified in accordance with the specified embodiments described below.

BRIEF DESCRIPTION OF THE DRAWING

FIG. 3 shows a data table stored in the first ROM illustrated in FIG. 2.

FIG. 7 shows a data table stored in the first ROM illustrated in FIG. 2, relating to the second embodiment of the present invention.

FIG. 11 shows a data table stored in the first ROM illustrated in FIG. 2, relating to the third embodiment of the present invention.

FIG. 13 shows a data table for forward rotation stored in the first ROM illustrated in FIG. 2, relating to the fourth embodiment of the present invention.

FIG. 14 shows a table for reverse rotation stored in the first ROM illustrated in FIG. 2, relating to the fourth embodiment of the present invention.

DESCRIPTION OF THE PREFERRED EMBODIMENTS

Figure 1:
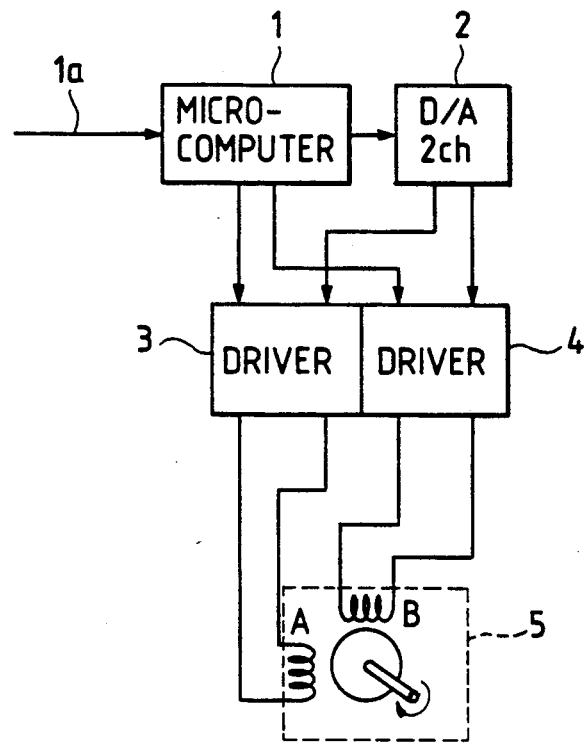
FIG. 1 shows a block diagram of a motor drive circuit according to the first embodiment of the present invention.

A description is hereinafter provided for the embodiments of the present invention with reference to the accompanying drawings. Initially the first embodiment will be described referring to FIGS. 1 through 6. FIG. 1 represents a data circuit of the motor, in which the reference numeral 1 denotes a microcomputer which is a control means for controlling the motor drive, numeral 2 denotes a two-channel D/A converter, numerals 3 and 4 denote constant current chopper types of bipolar motor drivers, and numeral 5 denotes a two-phase bipolar type of stepping motor. Microcomputer 1 comprises a first ROM 12 for storing, in the form of a table, an exciting current value corresponding to a rotational position, an address register 11 to access the first ROM 12, a CPU 10 for performing the designated control, and a second ROM 13 for storing a program.

Figure 5:
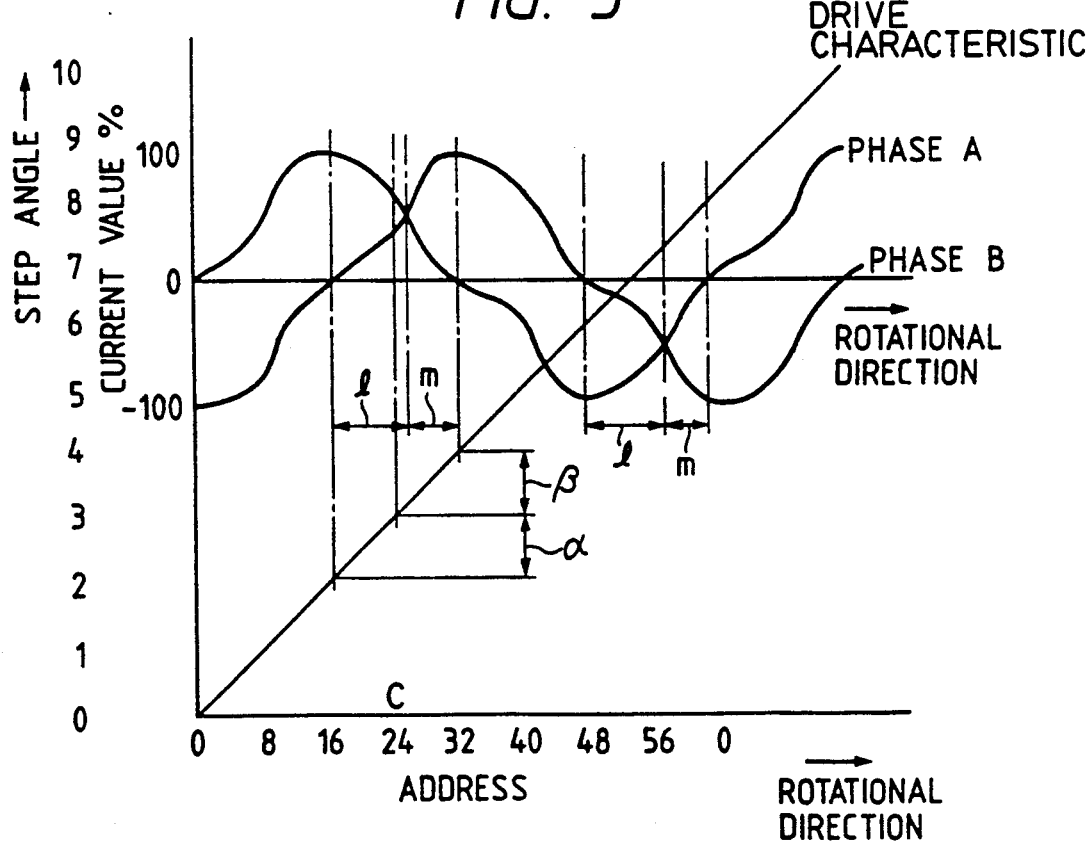
FIG. 5 shows a drive characteristics diagram of the motor and data of the data table illustrated in FIG. 3.

FIG. 3 shows the table stored in ROM 12 of FIG. 1. In this table, one cycle of each phase of the stepping motor is divided into 64 sections. The current value ratios of phase A and phase B stored in ROM 12 are experimentally determined. FIG. 5 shows the data characteristics of the data table. The data characteristic can be obtained based on the drive characteristic in FIG. 5, where the stepping motor rotates through a uniform angle each time the next address is sequentially accessed and the corresponding current value is read out of the ROM 12. Accordingly, for instance, when the D/A converter is a 6 bit converter, the current value of the current that can be designated to flow through phases A and B can have 64 different values. These are designated by 64 addresses in the ROM 12 and are numbered 0 through 63. The maximum value of the current is assigned address 63. The current values in the table in FIG. 3 are given in percentage terms. To drive the stepping motor through one step angle, eight addresses must be successively accessed in ROM 12. The data characteristics of this table are asymmetrical with respect to the address where the current value peaks. The data characteristics of this table also indicate that the current value of one phase increases drastically until only a current value for one phase substantially exists, from the point where the current values of the two phases are substantially on the same level. Then, the current value falls gradually toward the point where the current values of the two phases have the same value, from the point where only one phase has a substantial current value. In this table of data characteristics, the number of addresses from the address where the phase A current value peaks and the phase B current value is zero, to the address where the current values for phases A and B are the same, differs greatly from the number of addresses from the address where the current values of the phases A and B are the same, to the address where the phase A current value is zero and the phase B current value peaks. When C denotes an intermediate address between the address at the peak of the phase A current value and the address at the peak of the B phase current value, the motor displacement 1 from the address at the peak of the phase A current value to C is equal to the motor displacement m from C to the address at the peak of the phase B current value.

Figure 6:
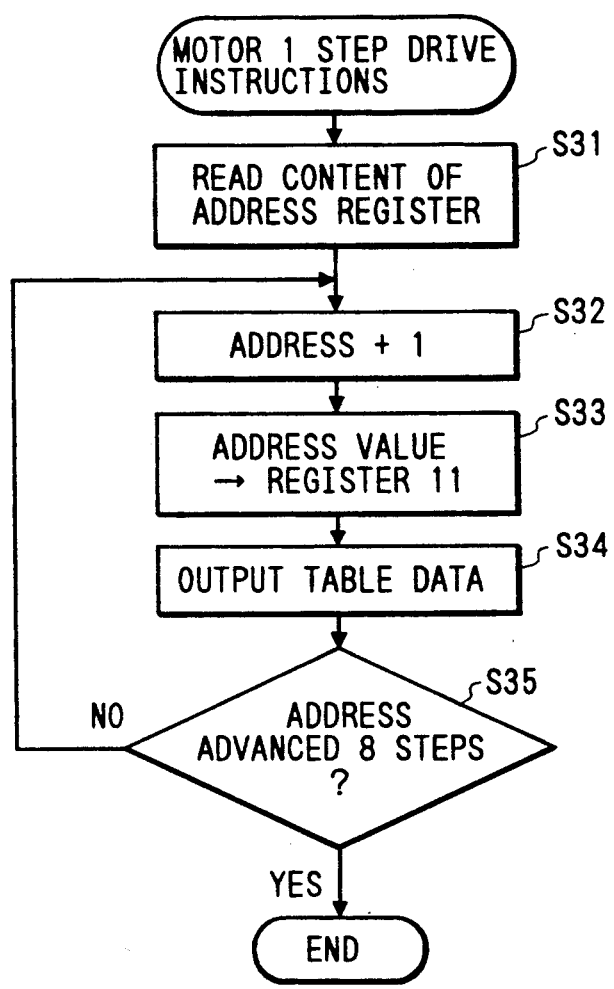
FIG. 6 shows a flow chart of the drive circuits illustrated in FIGS. 1 and 2.

The operation of above configuration will be hereinafter described with reference to the flow chart in FIG. 6.

Upon receiving 1 step angle drive command 1a, microcomputer 1 reads the current address value from the address register 11 at step S31, and the address value is incremented by one step at step 32 to thereby renew it. The renewed address value is stored in the address register 11 at step S33. The current value is read out from the table shown in FIG. 3 at step 34, and the read data is input into the D/A converter 2, and the output signal from this converter is sent to the drivers 3 and 4. D/A converter converts this value into an analog value to send it to the driver. The drivers 3 and 4 transmit the current in conformity with the current intensity from the D/A converter 2 and the positive/negative data of the microcomputer to each phase, A and B, of the motor, thereby exciting each phase A and B, and the motor starts. Then, a check is made at step S35 to determine if the address has been advanced by 8 steps for a 1-step angle drive command of the motor. Otherwise, the motor is returned to step 2 to repeat the same operation. In the event 8 step advancement is achieved, the operation is completed.

In a driving control system of the stepping motor according to the embodiment as detailed above, the current value supplied to each phase of the motor is assigned in the data table in such a manner that the intervals of the signal exciting each phase are subdivided, and inter-phase drive of the motor is accomplished by the current value read out in sequence from said table in conformity with the address so as to ensure the gradual driving of the motor by plural steps. The system is preset such that the number of addresses from the address where the current value of phase A is at a peak and the current value of phase B is zero, to the address where the current values of phases A and B are the same, differ from the number of addresses from the address where the current values of the phases A and B are the same, to the address where the current value of the phase B is at a peak. This eliminates uneven rotation of the motor and ensures that the magnitude of rotation of the stepping motor is equal each time an address is sequentially accessed, thereby resulting in highly accurate driving.

Figure 8:
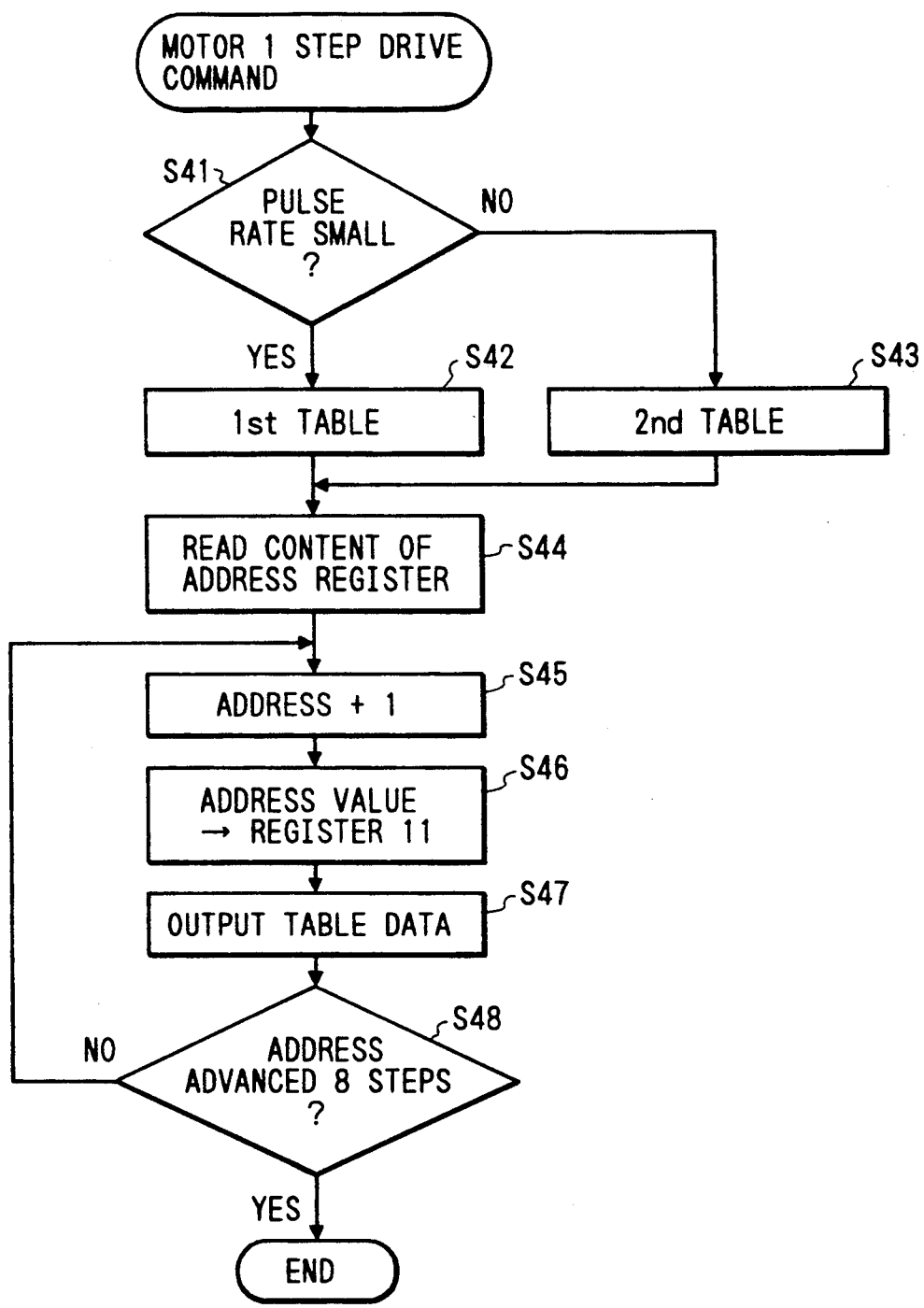
FIG. 8 shows a flow chart of the drive circuit illustrated in FIGS. 1 and 2, relating to the second embodiment of the present invention.
Figure 9:
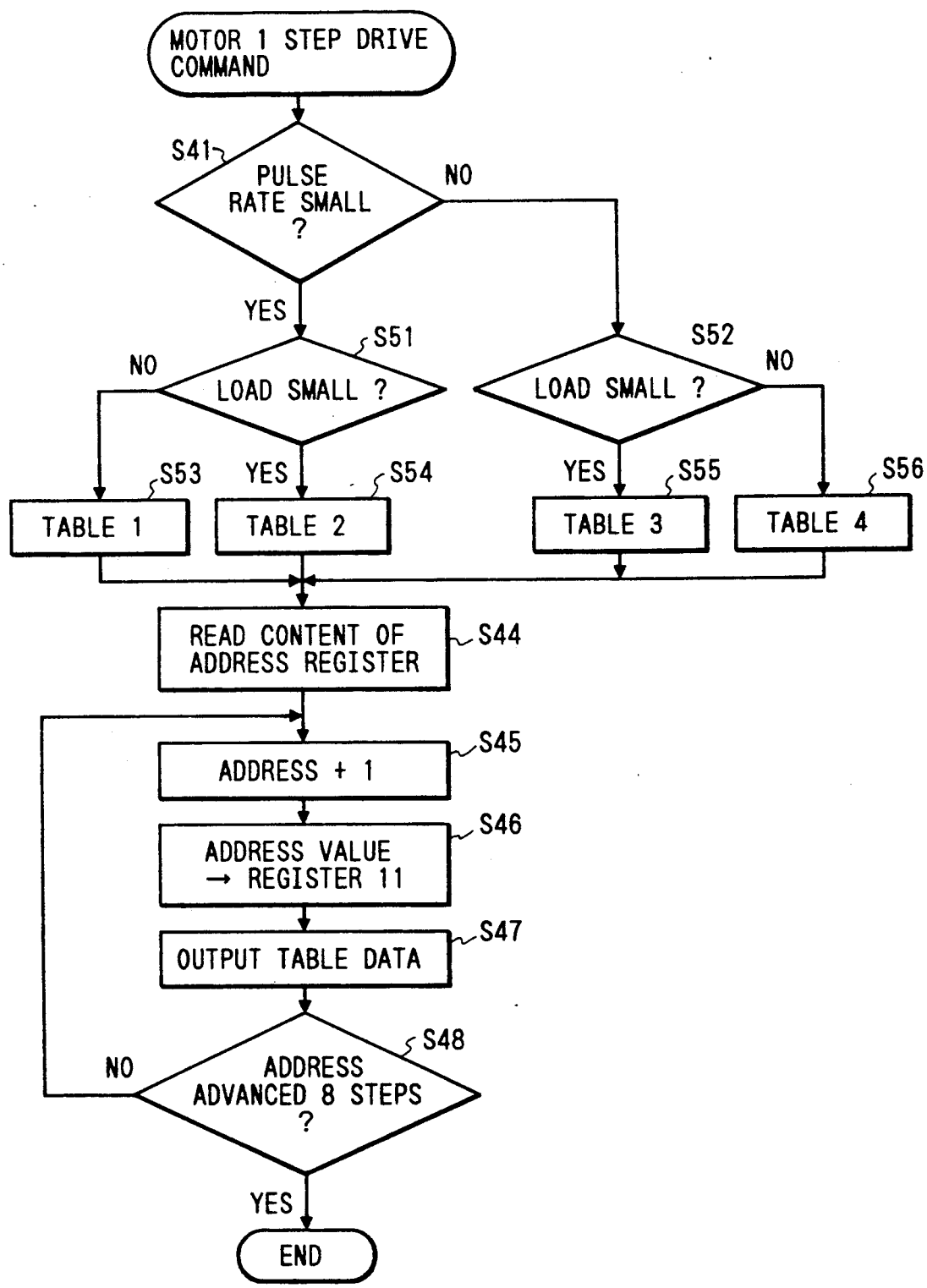
FIG. 9 shows a flow chart relating to a determination of load intensity based on FIG. 8.

The second embodiment according to the present invention will next be described with reference to FIGS. 7 through 9. The same reference numerals are assigned to the same elements as in the first embodiment, and the specific description thereof is omitted.

Figure 2:
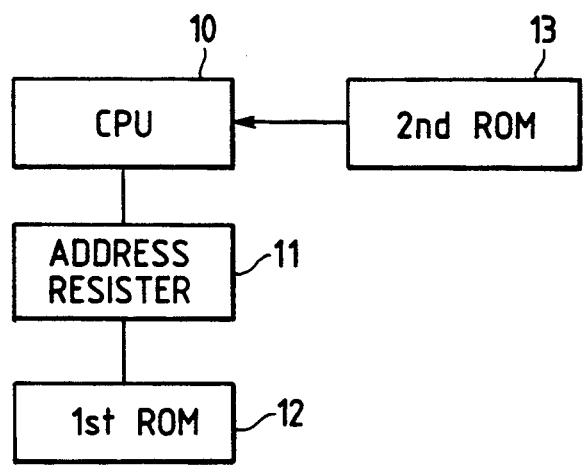
FIG. 2 shows an internal block diagram of the micro computer illustrated in FIG. 1.
Figure 4:
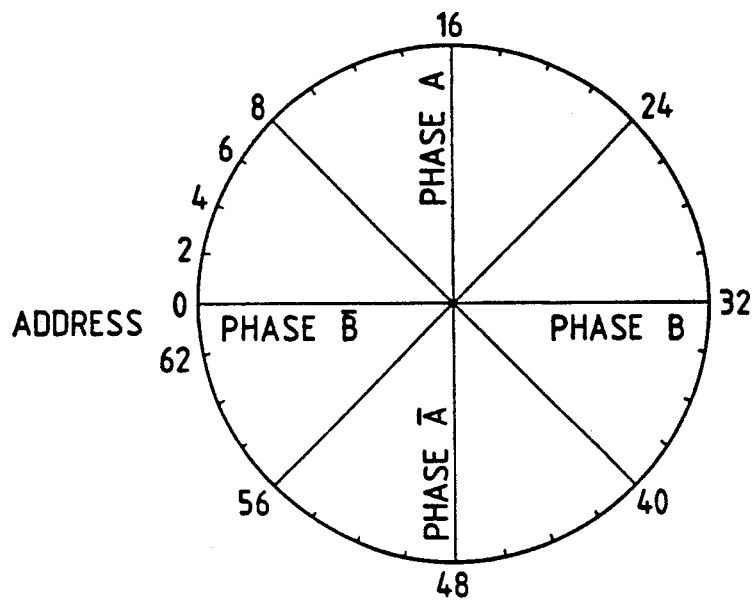
FIG. 4 shows a diagram dividing the one-cycle phase of the stepping motor illustrated in FIG. 1 into 64 sections.

The microcomputer 1 illustrated in FIGS. 1 and 2 includes the first ROM 12 for storing the excited current value corresponding to the rotational positions as shown in the figures in the form of tables. Inside the first ROM 12, provided are a plurality of tables, for instance two tables, in which the ratio of each current value varies according to the driving conditions of motor, as shown in FIGS. 3 and 7. In the tables defining the peak current value as 100%, the current value ratios of the phases A and B and their corresponding addresses are determined. In these tables one cycle of phase energization of the stepping motor is divided into 64 sections as shown in FIG. 4, and the current value ratios of phases A and B are determined experimentally. It will be described with the aid of FIG. 3 by way of example how the above-mentioned ratio of the current value in each table is determined. FIG. 5 shows the data characteristics of the data table described in FIG. 3. These data characteristics are determined based on drive response characteristics which allow the stepping motor to rotate through the same angle each time the address is advanced as shown in FIG. 5. Under the control of CPU 10, either the first table shown in FIG. 3 or the second table shown in FIG. 7 is selected in conformity with the driving conditions of the motor.

The operation of the above-mentioned configuration will be described with reference to the flow chart in FIG. 8, where the driving conditions are given in terms of the pulse rate.

When the microcomputer 1 receives the command to drive the motor through 1 step angle via the terminal 1a, it discriminates the magnitude of the pulse rate or the drive condition of the motor. For a low pulse rate, the first table is selected at step 42, while for a high pulse rate the second table is selected at step 43. Therefore CPU 10 determines the magnitude of the pulse rate to thereby select the first or second table from the first ROM 12 via address register 11. Once the table is selected, advancement is made to the step S44 and the address value of the address register 11 is read at step S44. The address value is then incremented by one step at step 45, so that the address value is renewed to consequently be stored in the address register 11 at step S46. At step S47 the current value is read out from the first or second table described in FIG. 3 or FIG. 7, respectively, and the obtained data is input into the D/A converter 2. The output signal of this converter is sent to the driver 3 or 4. D/A converter 2 converts this value into an analog value to send it to the driver. The driver 3 and 4 transmit the current, in conformity with the intensity of the current from the D/A converter 2 and the positive/negative data of the microcomputer, to each phase A and B of the motor, thereby exciting each phase A and B to start the motor. A check is then made at step S48 to determine if the address is advanced by 8 steps for the 1-step angle drive command of the motor. Unless 8 step advancement has been achieved, the motor is returned to the step S45 to thereby repeat the same operation, whereas in the event the address has been advanced by 8 steps, the operation is finished. In the above-mentioned second embodiment, only the pulse rate has been mentioned as a drive condition. As also shown in FIG. 9, the drive conditions may include the load intensity. In this case, four tables are required to be stored in the first ROM, and the pulse rate intensity and the load intensity are determined to thereby select one table out of four. Therefore, as the number of motor drive conditions is increased, the more tables are required.

According to the second embodiment of the present invention as detailed above, there is provided a drive control system for the stepping motor of a facsimile device, in which 1) paper for the facsimile device is fed by means of a stepping motor;

2) the value of the current flowing into each phase of the motor is determined by data tables so as to subdivide the intervals of the signals exciting the phases of the stepping motor; and 3) the motor is driven to feed the paper using the current value read out in sequence according to the addresses in the data table in such a manner that interphase drive of the motor is performed by a plurality of steps, characterized in that:

1) the motor is provided with a plurality of data tables to be selected according to the drive conditions of the motor;

2) an appropriate data table can be selected under different drive conditions because the selected table value is preset such that the stepping motor is rotated through the same rotational angle each time the address is advanced one by one; and 3) the magnitude of the rotational angle is always kept constant due to the selected table each time the address is advanced, thereby eliminating the possibility of uneven rotation and ensuring highly accurate paper feeding.

Figure 12:
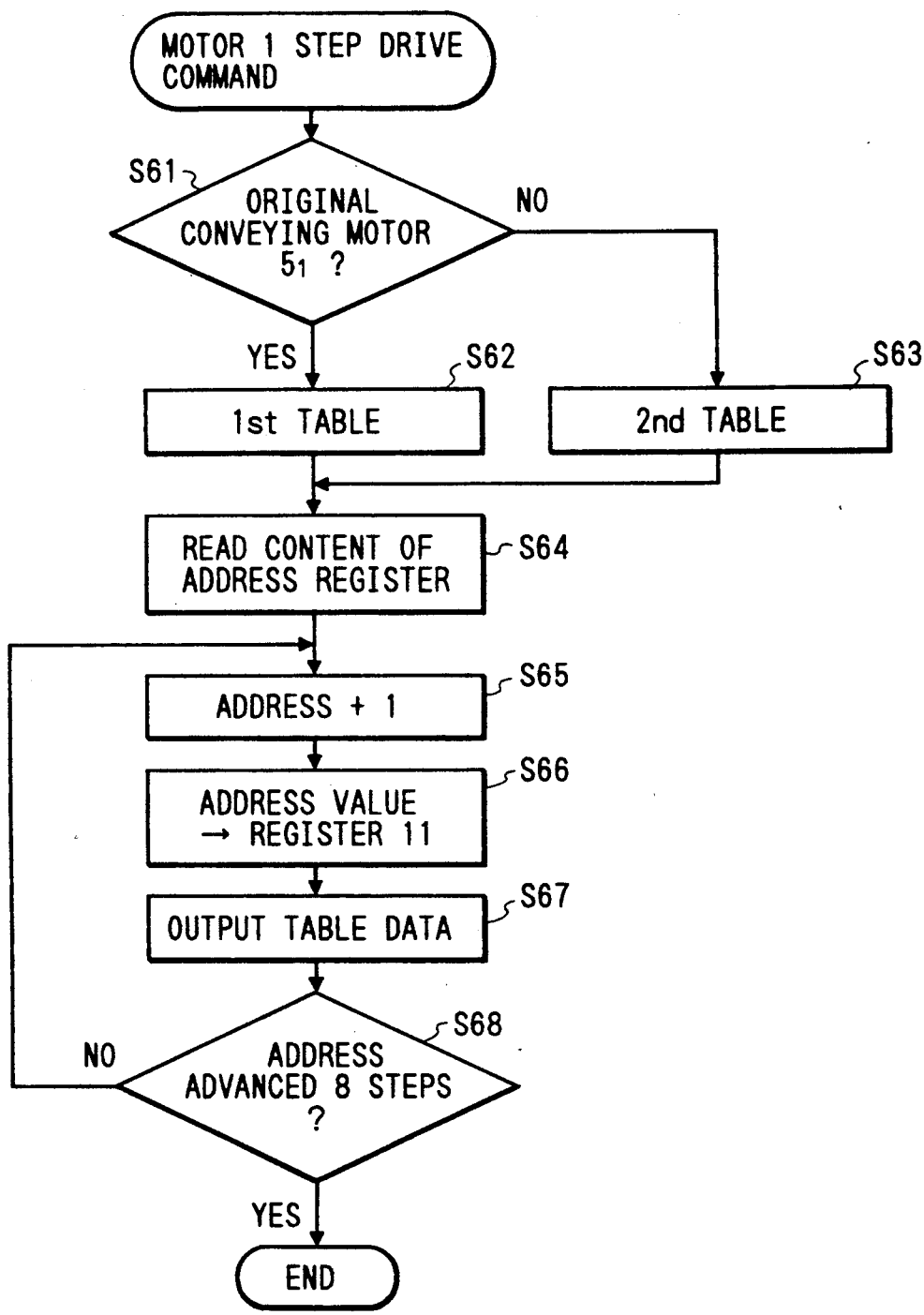
FIG. 12 shows a flow chart of the drive circuit illustrated in FIGS. 10 and 2, relating to the third embodiment of the present invention.

The third embodiment according to the present invention will next be described with reference to FIGS. 10 through 12, in which the same elements as those in the first embodiment are denoted with the identical reference numerals, and the specific description thereof will be omitted.

Figure 10:
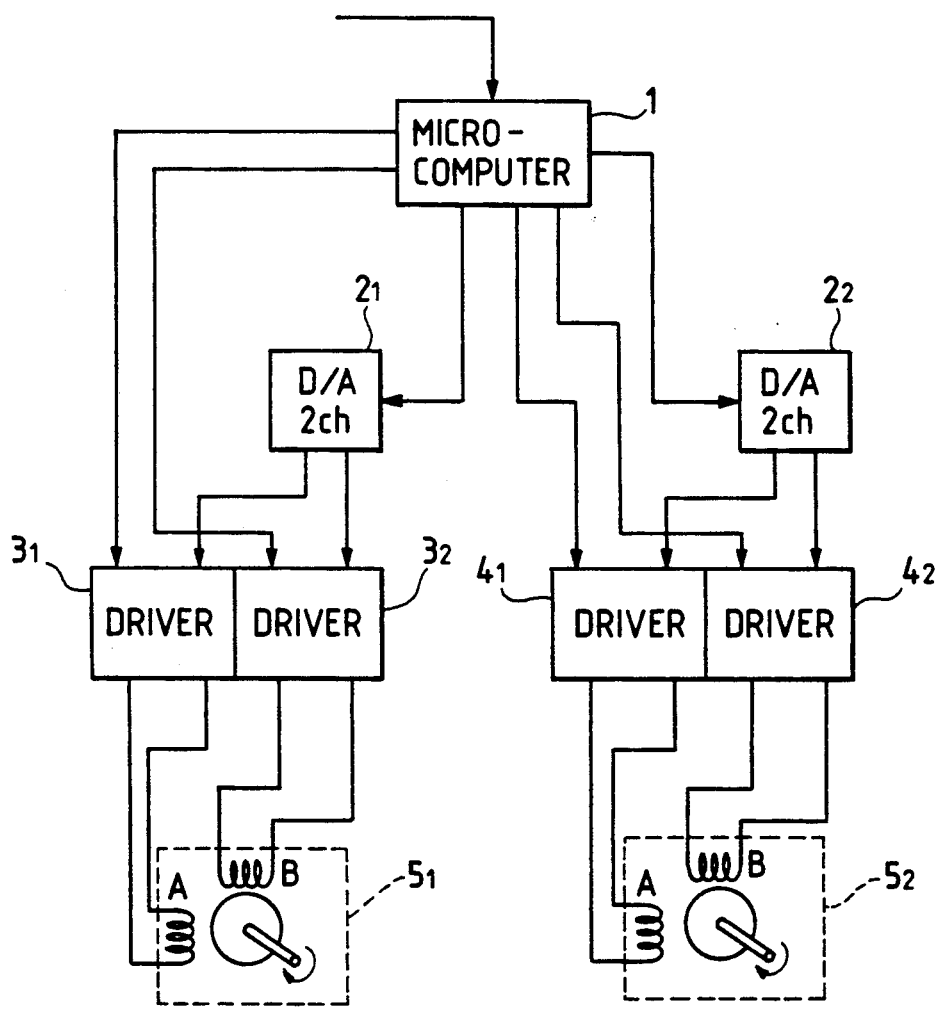
FIG. 10 shows a block diagram of the drive circuit of the stepping motor for a facsimile device according to the third embodiment of the present invention.

FIG. 10 illustrates the driving circuit of the stepping motor used to feed record or draft paper for a facsimile device, wherein the reference numeral 1 denotes a microcomputer which is a control means for controlling the drive, the numerals $2_1$ and $2_2$ represent D/A converters with two channels, the numerals $3_1$, $3_2$, and $4_1$, $4_2$ stand for bipolar motor drives of the constant current chopper type, the numerals $5_1$ and $5_2$ indicate stepping motors of the two-phase bipolar type, 5 denotes a motor for transferring draft paper, and $5_2$ denotes a motor for transferring record paper. The first ROM 12 is provided in a microcomputer to store the exciting current value in the form of a table corresponding to the rotation position as shown in FIG. 2. In the first ROM 12 there are provided, for example, two tables to be selected depending on which motor $5_1$ or $5_2$ is in operation, as illustrated in FIGS. 3 and 11. In these two tables, the peak current value is 100% and the ratio of the current value corresponding to each address in the above range is varied respectively. In these tables, one step of the motor is determined by dividing one cycle of each phase energization of the stepping motor into 64 sections as shown in FIG. 4, and the current value ratio for phase A and phase B in each step is determined experimentally. The method of determining the current value ratio of phases A and B in these tables is described below, by way of example, quoting the table in FIG. 3. FIG. 5 shows the characteristics of data in the table in FIG. 3, which is determined based on the drive response characteristics shown in FIG. 5, so that the magnitude of the stepping motor rotational angle is kept always constant for every advance of the address.

Then the first table in FIG. 3 and the second table in FIG. 11 are selected by the control of CPU 10 in accordance with the motor $5_1$ and $5_2$ to be used.

The action of above-mentioned system will next be explained below with reference to the flow chart in FIG. 12.

When the microcomputer 1 receives the command to drive motor $5_1$ or $5_2$ by one angular step, it determines in step S61 whether the command is for the motor $5_1$ to transfer draft paper or not. In case it is for the motor $5_1$, the first table in step S62 is selected, whereas if it is not for the motor $5_1$, but for the motor $5_2$ to transfer record paper, the second table in step S63 is selected.

That is to say, the CPU 10 selects either the first or the second table from the first ROM 12 via the address register 11 by determining which motor of $5_1$ or $5_2$ is to be specified. After the table is selected, the process is advanced to S64, where the present address value is read out from the address register 11. In step S65, the address value is incrementally advanced by one step and is renewed. The renewed address value is stored in the address register 11 in step S66. The current value is then read in step S67 from the first table and the second table as shown in FIG. 3 or FIG. 11, respectively. The obtained data is inputted into the D/A converter $2_1$ or $2_2$, which outputs a signal into the drive $3_1$, $3_2$ or $4_1$, $4_2$. The D/A converter $2_1$ or $2_2$ supplies the current to the drive $3_1$, $3_2$, $4_1$, or $4_2$ after the input value is converted into an analog value. The drive $3_1$, $3_2$ or $4_1$, $4_2$ forwards plus or minus data from the microcomputer and the current corresponding to the value sent from the D/A converter $2_1$ or $2_2$, to the respective phases A and B of the motors. Each phase A and B of the motor is thus excited and the motor starts. In step S68, a determination is made about whether the address advances by eight steps for the command of one step angular drive of the motor. Provided that it is not advanced by eight steps, the same action is repeated by returning to step S65. In case it is advanced by eight steps, the action is completed. As a consequence, when the microcomputer 1 receives the command for performing a one step angular drive for the draft paper transfer motor $5_1$, the first table in FIG. 3 is selected. The current value corresponding to an address in the first table is then read from the first table and the draft paper transfer motor $5_1$ is driven by such current to thereby transfer the draft paper.

On the other hand, when the microcomputer 1 receives the command for performing a one step angular drive for the draft paper feed motor $5_2$, the second table in FIG. 11 is selected. In accordance with the current value corresponding to the address, which is read in sequence from the second table in FIG. 11, the record paper transfer motor $5_2$ is driven to consequently transfer the record paper.

As described in detail above, the stepping motor control system for a facsimile device according to the third embodiment of the present invention has the following constitution:

1) facsimile paper is transferred by a stepping motor;

2) the current values to be supplied to each phase is determined by data tables in such a manner that intervals of the signals exciting each phase of said motor are subdivided; and 3) the motor is driven by the current value which is read in sequence corresponding to the address specified in the table, so that the motor can be driven with multiple steps for each phase thereof;

wherein the control system comprises at least two kinds of stepping motors for transferring draft paper and record paper respectively, and a plurality of tables to be selected in accordance with the motor to be used, characterized in that:

1) an appropriate table can be selected regardless of the motor to be used since the value in the selected table is predetermined so as to keep the magnitude of the rotational angle of the motor the same for every advance of the address; and 2) as the magnitude of the rotational angle of the stepping motor is always the same each time the address is advanced in accordance with the selected table, the motor is capable of being driven with a uniform and constant speed, thereby ensuring a highly accurate transfer of draft paper and record paper.

Now the fourth embodiment of this invention will be described below with reference to FIGS. 13 through 19, in which the same elements as those of the first embodiment are denoted by the identical symbols, and the specific description thereof will be omitted.

In FIG. 1, the microcomputer 1 is provided with the first ROM 12 for storing the exciting current value in the form of a table corresponding to the rotational position as shown in FIG. 2. The first ROM 12 includes a plurality of tables, by way of example, two tables having a different current value ratio in response to the forward/reverse rotation of the motor as shown in FIGS. 13 and 14.

FIG. 13 represents a table for the forward rotation of the motor and FIG. 14 represents a table for the reverse rotation of the motor.

Figure 15:
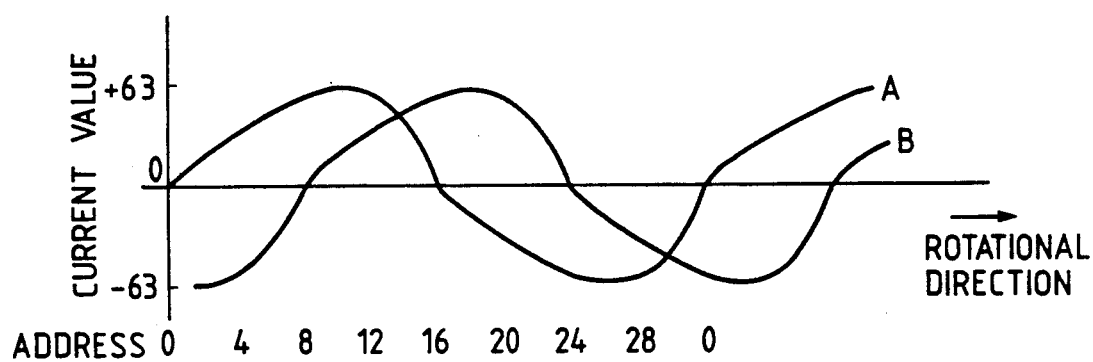
FIG. 15 shows a data characteristic diagram of the data table illustrated in FIG. 13.
Figure 16:
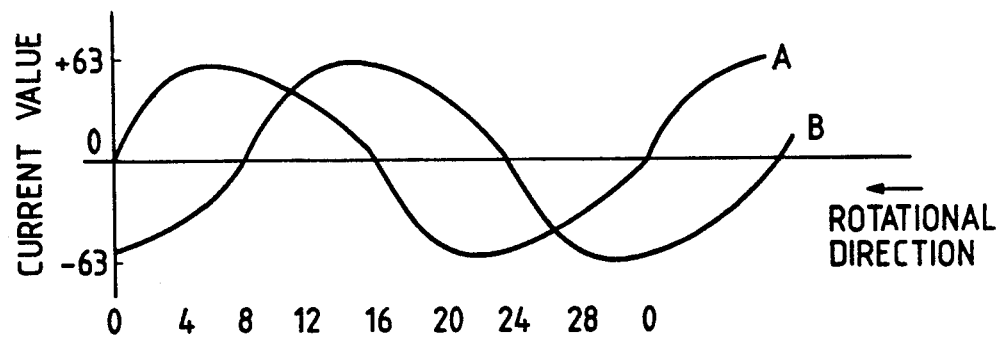
FIG. 16 shows a data characteristic diagram of the data table illustrated in FIG. 14.
Figure 17:
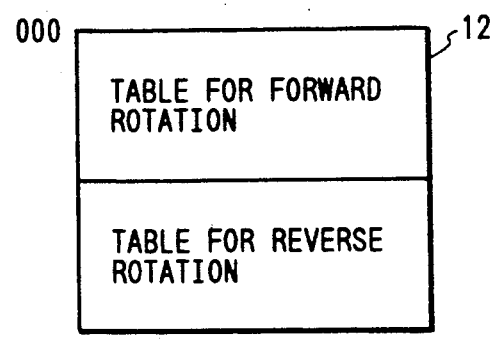
FIG. 17 shows the state of the tables shown in FIGS. 13 and 14 stored in the first ROM illustrated in FIG. 2.

The exciting current value to be supplied to phases A and B is determined by taking into account the motor load as shown in FIGS. 15 and 16.

The characteristics shown in FIG. 15 are such that the current value curve is made gentle in the region of leading edge toward the forward rotational direction. For the reverse operation, it is desirable that the current value has characteristics so as to make a gentle curve in the region of the leading edge as shown in FIG. 16.

In these tables, one cycle of phase energization of the stepping motor is divided into 32 sections to obtain one step. Accordingly, plus or minus data and the current value of phases A and B can be obtained by reading the point on the vertical axis corresponding to "0" through "31" of the addresses shown in FIGS. 15 and 16.

In case the D/A converter is a 6 bit converter, the current value can be selected from a point between "0" through "63" of the addresses.

The tables in FIGS. 13 and 14 are prepared in such a manner that the address at the maximum current value is "63" for the output of the converter 2 and the current value corresponding to each address value is read from the curves in FIGS. 15 and 16. These tables includes plus or minus information and the amount of the current.

In each phase, the current intensity is expressed by using 6 bits, and the plus or minus data that is shown as 1 or 0 is expressed by 1 bit. For the purpose of explanation, the data are shown by a decimal system number like +63.

The data tables for forward rotation (FIG. 13) and for reverse rotation (FIG. 14) are stored in the first ROM at a location spaced from each other. However, the addresses listed from the upper part to the lower part in the tables coincide with each other, that is, the addresses in both tables are correlated with each other and take the same address value as shown in FIGS. 13 and 14.

As will be seen from FIGS. 13 and 14, the current values of the forward and reverse rotation are arranged in reverse order in one cycle of phase energization of the stepping motor.

The method in the above embodiment will be explained with reference to FIG. 18.

When the microcomputer 1 receives the command 1a to perform a one step angular drive, the present address value is read from the address register 11 (step S1). Then forward or reverse rotation data in the command are read (step S2). In case the forward direction rotation data is read, the address value is incremented by one; and in the case the reverse direction rotation data is read, the address value is decremented by one.

Since the address value in FIGS. 13 and 14 is module 32, if the present value is "31" and an increment is made, the new address value is "0" (step S4); and if the present value is "0" and a decrement in the address is made, the new address value is "31" (step S10).

The renewed address value (correlated address) is newly stored in the address register 11 (steps S6, S11). In this case, the address value that is set in the address register is converted into an absolute address value.

Then in the case of forward rotation, the current value is read from the table in FIG. 13 in step S7; and in the case of reverse rotation, it is read from the table in FIG. 14 in step 12. The data read from the table is input into the D/A converter 2 which converts the input data into an analog value to thereby input the value into the drive.

The drives 3, 4 supply the current, the value of which corresponds to the plus or minus data from the microcomputer and the current value from the D/A converter, to phases A and B of the motor. Thus, each phase A and B of the motor is excited and the motor starts.

In the above embodiment, there are provided two tables, one is for forward rotation and the other for reverse rotation. However, taking into account the fact that the respective absolute values in these two tables, for the forward the reverse rotation, have a fixed relationship, it is possible to provide only the table for the forward rotation. In the case of the reverse rotation, its current value can be read from the table for the forward rotation by changing the position or address to be read.

A modification of the fourth embodiment will be described below.

The table for forward rotation is solely stored in the first ROM 12. During reverse rotation, the read position is changed and the value of the current is read from the table for forward rotation. Hence, for reverse rotation, the type of address specified in the address register is most important.

As can be seen from the tables in FIGS. 13 and 14, the rules are fixed. For instance, the data for address 9 of the forward rotation table is 60 for phase A and +8 for phase B. The data for address 31 of the reverse rotation table is −8 for phase A and −60 for phase B. Thus, if the reverse signs are ignored, the data for phases A and B of the forward rotation table will be the same as the data for phases A and B of the reverse rotation table.

This means that when forward rotation has brought the position to address 0 and a reverse rotation command is received so that reverse rotation data from address 31 (see FIG. 14) can be retrieved, it is simply a matter of switching the data read from address 9 (see FIG. 13) with phases A and B, and reversing the signs. Because of the fixed relationship between the data of these two tables, all that is required is an understanding of the relationships between the addresses.

These fixed relationships mean that if the addresses for forward rotation are indicated by $AD_S$ and addresses for reverse rotation are indicated by $AD_G$, then $$AD_S = (32 + 8) - AD_G \quad (1)$$
$$= 40 - AD_G \quad (2)$$

When the reverse rotation address AD is required, the $AD_G$ address is derived from the above equation, inasmuch as data of the forward rotation table has only to be invoked. In the above equation (1), the number 32 is used because one cycle of phase energization of the stepping motor has been partitioned into 32 sectors. The number 8 in the equation (1) is derived from the eight steps of the phase differences of phases A and B (see FIG. 13). By adjusting the fineness of the steps and the phase different values, the numbers 32 and 8 in equation (1) can be changed to different values.

In this embodiment the available addresses are limited to 0 through 31.

In equation (1), if $AD_S$ exceeds 31, the value of $AD_S$ minutes 32 will have to be made $AD_S$. Consequently, the conversion will be as follows:

$$AD_X = 40 - AD_g$$

if $AD_x \leq 32$ then $AD_S = AD_X$ \quad (3)

otherwise $$AD_S = AD_X - 32 \quad (4)$$

Figure 19:
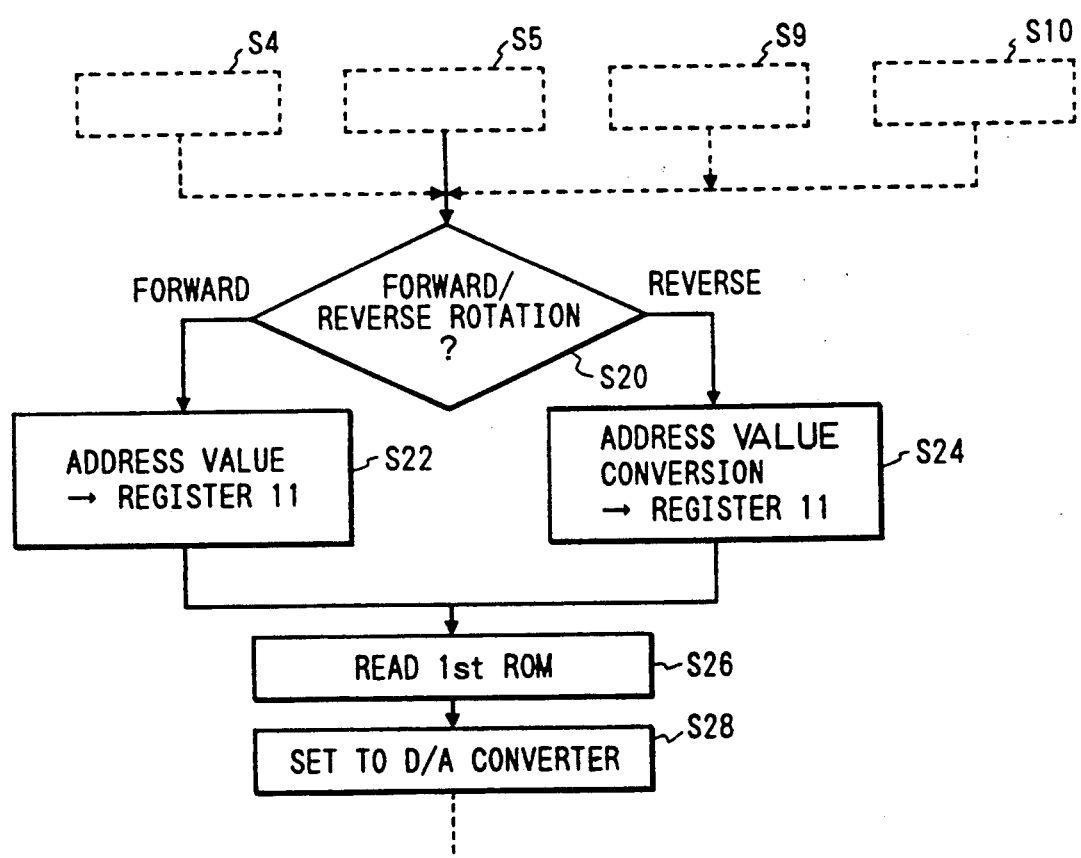
FIG. 19 shows a flow chart shown in FIGS. 1 and 2, relating to the fourth embodiment of the present invention, and specifically relating to a modification of the fourth embodiment of the present invention.
Figure 20:
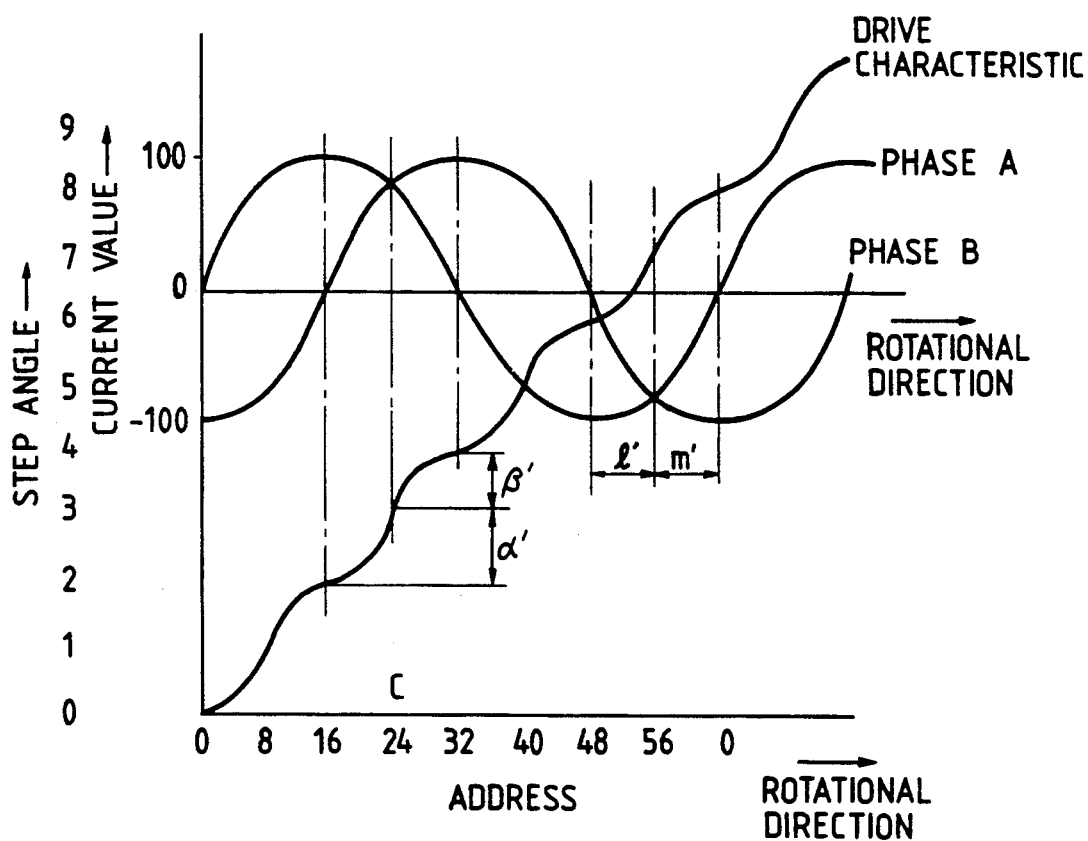
FIG. 20 shows a table data and the driving characteristics of a conventional stepping motor.

The control for the present embodiment will be explained below referring to FIG. 19. In the control procedures in the fourth embodiment, steps S1, S2, S3, S4, and S5 are the same as this embodiment's steps S1, S2, S8, S9, and S10. The flow chart in FIG. 19 omits these steps.

Figure 18:
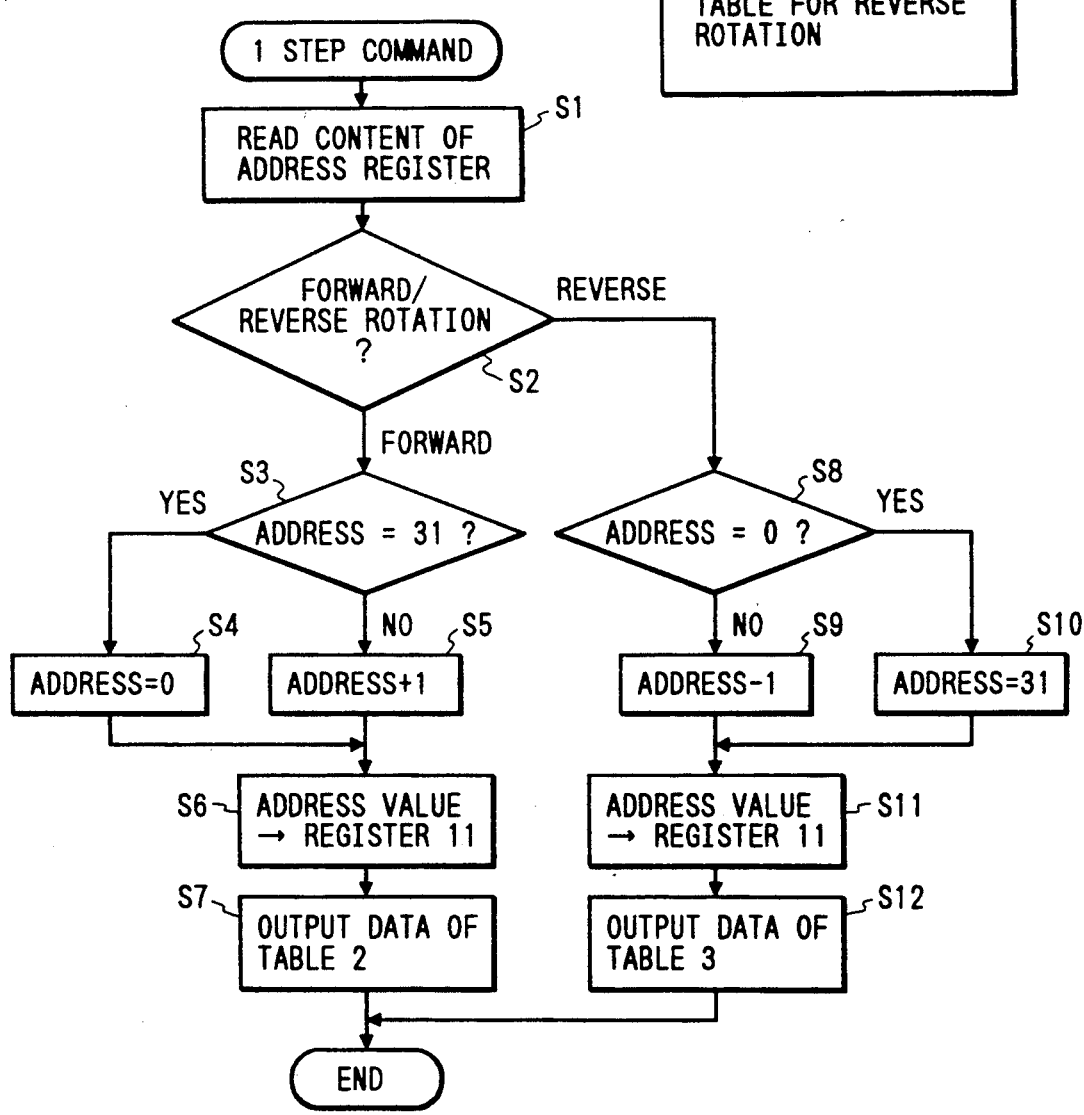
FIG. 18 shows a flowchart of the drive circuit shown in FIGS. 1 and 2, relating to the fourth embodiment of the present invention.

When a one-step command is received, the same control procedures as steps S4, S5, S9 and S10 in FIG. 18 change the address just as if there were equivalent independent tables. The next step S20 determines if the command is for forward or reverse rotation. For forward rotation, step S22 stores the address arrived at by steps S4 and S5 in register 11. In step S26, the value of the current for forward rotation sent from the first ROM 12 is read according to the value stored in address register 11. In step S28, the value read out is set in D/A converter 2, for stepping stepper motor 5.

In step S20, if a reverse rotation command is received, the above conversions (3) and (4) ar made in step S24 and the result stored in register 11. Here, a pseudo-read-out of the value of the current for reverse rotation is made from the forward rotation table.

In the fourth embodiment described above, as shown in FIGS. 13 and 14 or FIGS. 15 and 16, the characteristics of the forward and reverse rotation tables are opposite from each other. However, in this embodiment, different tables are being prepared, so if there appears to be a lag in the current characteristics for motor operation in either forward and reverse rotations, there is no need for the opposite values, and they can be different from those in FIGS. 15 and 16.

Further, in this embodiment, the forward rotation table has been stored in memory, but it will be just the same if the reverse rotation table is stored in memory.

Thus, through the stepping motor drive control system according to the fourth embodiment of the present invention, the start-up characteristics with forward and reverse rotation can be improved.

Tables have been prepared independently for forward rotation and reverse rotation, to enable much finer control for each. Memory can be saved by using the tables in common.

None of the stepping motor polarities are limited to just two in these embodiments of the present invention.

As described in detail hereinbefore, this invention enables the realization of a drive control system for stepping motors featuring a high-precision drive. The intervals of the signals exciting the phases of the motor are subdivided and the values of the current flowing in the different phases of the motor are stored in data tables. The motor is driven according to the current values read out sequentially from the addresses in the tables such that the motor can be driven in gradual steps for these intervals. Each time the addresses are incremented by 1, the magnitude of the angle of rotation of the motor is set to the same value.

What is claimed is:

1. A drive control system for stepping motors, comprising:

a stepping motor including a plurality of phases adapted to receive an excitation current to drive said motor, said stepping motor adapted to operate in a micro stepping mode in which each phase is excited simultaneously with an excitation current within the range of a step;

a plurality of drivers adapted to supply the excitation current to each of said phases; and control means for controlling the excitation current supplied to said plurality of drivers, said control means having a data table in which a ratio of the excitation current values of the phases at each step is stored, and in which the values of the excitation current flowing in each phase of the motor and their corresponding addresses are stored, said stepping motor being stepwise driven through a rotation angle by an excitation current having a current value is read out of the data table which corresponds to an address, associated with the read out excitation current value stored in the address data table, which is incremented, wherein the data table values are set such that the magnitude of the rotation angle of said motor is always the same each time an address in the data tables is incremented by 1, wherein the number of addresses from the address at which the excitation current value of one of the phases is at a peak and the excitation current value of another of the phases is zero to the address at which the excitation current values for the one of the phases and the another of the phases are equal, is different from the number of addresses from the address at which the excitation current values of the one of the phases and the another of the phases are equal to the address at which the excitation current value of the one of the phases is zero and the excitation current value of the another of the phases is at a peak.

2. A drive control system for stepping motors, comprising:

a stepping motor including a plurality of phases adapted to received an excitation current to drive said motor said stepping motor adapted to operate in a micro stepping mode in which each phase is excited simultaneously with an excitation current within the range of a step;

a plurality of drivers adapted to supply the excitation current to each of said phases; and control means for controlling the excitation current supplied to said plurality of drivers, said control means having a data table in which a ratio of the excitation current values of the phases at each step is stored, and in which the values of the excitation current flowing in each phase of the motor and their corresponding addresses are stored, said stepping motor being stepwise driven through a rotation angle by an excitation current having a current value read out of the data table which corresponds to an address, associated with the read out excitation current value stored in the address data table, which is incremented, wherein the data table values are set such that the magnitude of the rotation angle of said motor is always the same each time an address in the data tables is incremented by 1, wherein the number of addresses from the address at which one of the phases and another of the phases have the same excitation current value to the address at which the one of the phases has a zero excitation current value and the another of the phases has a non-zero excitation current value is less than the number of addresses from the address at which the one of the phases has a zero excitation current value and the another of the phases has a non-zero excitation current value to a different address at which the one of the phases and the another of the phases have the same excitation current value.

3. A drive control system for stepping motors, comprising:

a stepping motor including excitation phases A and B adapted to receive an excitation current to drive said motor, said stepping motor adapted to operate in a micro stepping mode in which each phase is excited simultaneously with an excitation current within the range of a step;

a first driver and a second driver adapted to supply the excitation current to phase A and phase B, respectively; and control means for controlling the excitation current supplied to said first and second drivers, said control means having a data table in which a ratio of the excitation current values of the phases at each step is stored, and in which the values of the excitation current flowing in each phase of the motor and their corresponding addresses are stored, said stepping motor being stepwise driven through a rotation angle by an excitation current having the current value read out of the data table which corresponds to an address, associated with the read out excitation current value stored in the address data table, which is incremented, wherein the data tables are set so that the number of addresses from the address where the phase A current value is at its peak and the phase B current value is zero, to the address at which the current values for phase A and phase B become equal, is different than the number of addresses from the address where current values of the phases A and B become equal, to the addresses at which the phase A current value is zero and the phase B current value is at its peak.

4. A drive control system according to claim 3, wherein said motor comprises means for actuating the feeding of paper feed in a facsimile device.

5. A drive control system for stepping motors, comprising:
a stepping motor including a plurality of phases adapted to receive an excitation current to drive said motor, said stepping motor adapted to operate in a micro stepping mode in which each phase is excited simultaneously with an excitation current within the range of a step;
a plurality of drivers adapted to supply the excitation current to said plurality of phases; and
control means for controlling the excitation current supplied to said plurality of drivers,
said control means having plural data tables in which the values of the excitation current flowing in each of the phases and their corresponding addresses are stored and in which a ratio of the excitation current values of the phases at each step is stored, said control means selecting one of said tables in compliance with the driving condition of said stepping motor, said stepping motor being driven through a rotation angle stepwise by an excitation current having the current value read out of the data tables which corresponds to an address, associated with the read out excitation current value stored in the data table, which is incremented, and wherein the current values of the data tables are set so that the magnitude of the angle of rotation of said motor is always the same each time the address in the data tables is incremented by 1, wherein the number of addresses from the address at which the excitation current value of one of the phases is at a peak and the excitation current value of another of the phases is zero to the address at which the excitation current values for the one of the phases and the another of the phases are equal, is different from the number of addresses from the address at which the excitation current values of the one of the phases and the another of the phases are equal to the address at which the excitation current value of the one of the phases is zero and the excitation current value of the another of the phases is at a peak.

6. A drive control system for stepping motors, comprising:
a stepping motor including a plurality of phases adapted to receive an excitation current to drive said motor to rotate in forward or reverse directions, said stepping motor adapted to operate in a micro stepping mode in which each phase is excited simultaneously with an excitation current within the range of a step;
a plurality of drivers adapted to supply the excitation current to said plurality of phases; and
control means for controlling the excitation current supplied to said plurality of drivers,
said control means having plural data tables in which the values of the excitation current flowing in each of the phases and their corresponding addresses are stored, and in which a ratio of the excitation current values of the phases at each step is stored, said control means selecting one of said tables in compliance with forward or reverse rotation of said stepping motor, said stepping motor being driven through a rotation angle stepwise by an excitation current having the current value read out of the data tables which corresponds to an address, associated with the read out excitation current value stored in the data table, which is incremented, the current values of said selected tables being set so that the magnitude of the angle of rotation of said motor is always the same each time the address in the address tables is incremented by 1, number of addresses from the address at which the excitation current value of one of the phases is at a peak and the excitation current value of another of the phases is zero to the address at which the excitation current values for the one of the phases and the another of the phases are equal, is different from the number of addresses from the address at which the excitation current values of the one of the phases and the another of the phases are equal to the address at which the excitation current value of the one of the phases is zero and the excitation current value of the another of the phases is at a peak.

7. A drive control system for stepping motors for paper feed in facsimile devices, comprising:
a stepping motor for transferring record paper including a plurality of phases adapted to receive an excitation current to drive said stepping motor, said stepping motor for transferring record paper adapted to operate in a micro stepping mode in which each phase is excited simultaneously with an excitation current within the range of a step;
a stepping motor for transferring document paper including a plurality of phases adapted to receive an excitation current to drive said stepping motor for transferring document paper, said stepping motor for transferring document paper adapted to operate in a micro stepping mode in which each phase is excited simultaneously with an excitation current within the range of a step;
a first driver adapted to supply the excitation current to each of said phases of said stepping motor for transferring record paper;
a second driver adapted to supply the excitation current to each of said phases of said stepping motor for transferring document paper; and
control means for controlling the exciting current supplied to said first and second drivers,
said control means having plural data tables in which the value of the excitation current flowing in each phase of the motor and their corresponding addresses are stored, and in which a ratio of the excitation current values of the phases at each step is stored, said control means selecting one data table from the plural data tables, said stepping motor being driven stepwise through a rotation angle by an excitation current having the current value read out of a data table which corresponds to an address, associated with the read out excitation current value stored in the data table, which is incremented, wherein the current valuers of the data tables are set so that the magnitude of the angle of rotation of said stepping motor is always the same each time the address in the data table is incremented by 1.

8. A drive control system according to claim 5, wherein the ratio of the excitation current values of the current value at each address to the peak current value differs in magnitude for each address.

* * * * *

UNITED STATES PATENT AND TRADEMARK OFFICE
CERTIFICATE OF CORRECTION

PATENT NO. : 5,198,741
DATED : March 30, 1993
INVENTOR(S) : YASUYUKI SHINADA, ET AL.

It is certified that error appears in the above-identified patent and that said Letters Patent is hereby corrected as shown below:

TITLE PAGE

[56] References Cited
    After "Assistant Examiner—Karen Masih" insert
        --Attorney, Agent, or Firm—Fitzpatrick, Cella, Harper and Scinto--.

IN THE DRAWINGS
    Sheet 1, FIG. 2, "RESISTER" should read --REGISTER--.

COLUMN 1
    Line 56, "ß,'" should read --ß'--.

COLUMN 5
    Line 51, "driver" (second occurrence) should read --drivers--.

COLUMN 6
    Line 46, "5" should read --$5_1$--.

COLUMN 7
    Line 6, "of" should read --of the--.

UNITED STATES PATENT AND TRADEMARK OFFICE
CERTIFICATE OF CORRECTION

PATENT NO. : 5,198,741
DATED : March 30, 1993
INVENTOR(S) : YASUYUKI SHINADA, ET AL.

It is certified that error appears in the above-indentified patent and that said Letters Patent is hereby corrected as shown below:

COLUMN 8
  Line 57, "includes" should read --include--.

COLUMN 9
  Line 45, "the" (second occurrence) should read --and the--.

COLUMN 10
  Line 32, "$AD_x=40—AD_g$" should read --$AD_x=40—AD_G$--; and
  Line 59, "ar" should read --are--.

COLUMN 12
  Line 6, "received" should read --receive--; and
  Line 7, "motor" should read --motor,--.

COLUMN 14
  Line 11, "number" should read --wherein the number--; and
  Line 61, "valuers" should read --values--.

Signed and Sealed this

Nineteenth Day of April, 1994

BRUCE LEHMAN

Attest:

Attesting Officer

Commissioner of Patents and Trademarks